BY Gordon Alan Hughes
Herchel Smith
INVENTORS

# United States Patent Office 3,328,408
Patented June 27, 1967

3,328,408
6-AZAESTRANES, INTERMEDIATES
AND PROCESS
Gordon Alan Hughes, Wayne, Pa., and Herchel Smith,
500 Chestnut Lane, Wayne, Pa. 19087; said Hughes
assignor to said Smith
Filed Jan. 30, 1964, Ser. No. 341,345
4 Claims. (Cl. 260—283)

This application is a continuation-in-part of co-pending application Ser. No. 228,384, filed Oct. 4, 1962, which is a continuation of applications Ser. No. 57,904, filed Sept. 23, 1960; Ser. No. 91,341, filed Feb. 24, 1961; Ser. No. 137,535, filed Sept. 12, 1961; Ser. No. 195,000, filed May 15, 1962; and ser. No. 196,557, filed May 16, 1962, all of which latter applications have been abandoned.

The invention relates to compositions of matter classified in the art of chemistry as estranes, more particularly to 6-azaestranes, to intermediates therefor, and to processes for making and using such compositions.

The term "estrane," as used by chemists, refers to the tetracyclic perhydrocyclopentanophenanthrene nucleus, having a methyl group at the 13-position thereof. The compositions of this invention possess a nitrogen atom in place of the carbon atom at position 6 of the estrane nucleus and hence are designated 6-azaestranes. In the normal configuration of the estrane system, any hydrogen atoms appearing at the 8, 10, and 13-positions possess what is designated as the β-configuration, i.e. they extend in a direction above the average plane of the tetracyclic ring system; and hydrogens present at the 9 and 14-positions, possess what is designated as the α-configuration, i.e. they extend in a direction below the plane of the ring system. While the compositions of the invention are named to describe the stereochemical configuration corresponding to that of the normal estranes, it is to be understood that the product of each of the given reactions is a racemic mixture of the named compound and its enantiomorph.

In describing the invention, reference will be made in the following specification to the annexed drawing, wherein.

The invention sought to be patented in a principal composition aspect is described as residing in the concept of a chemical compound having a 3-methoxy - 6 - azaestra-1,3,5(10),8,14-pentaen-17-one structure.

The tangible embodiments of the composition aspects of the invention possess the inherent general physical properties of being white crystalline solids, are substantially insoluble in water and are generally soluble in organic solvents such benzene and tetrahydrofuran. Examination of the compounds produced according to the hereinafter described process reveals, upon ultraviolet and infrared spectrographic analyses, spectral data supporting the molecular structures herein set forth. Particularly evident are spectral characteristics indicative of the 6-nitrogen atom. The aforementioned physical characteristics, taken together with the nature of the starting materials, the mode of synthesis, and elemental analyses, confirm the structures of the compositions sought to be synthesized and patented.

The tangible embodiments of the composition aspects of the invention possess the inherent applied use characteristic of exerting a pharmacological effect in animals as evidenced by evaluation according to standard test procedure, particularly diuretic and hypoglycemic activity. This finding indicates their usefulness in the treatment of congestive heart failure, premenstrual syndrome (edema), edema of pregnancy, renal edema (nephrosis), cirrhosis with ascites, drug-induced edema, and diabetes mellitus.

The intermediate compositions of this invention are useful in practicing the process aspects of the invention in the making of the principal compositions of the invention.

The invention sought to be patented, in a principal process aspect, is described as residing in the sequence of reaction including: treating a 2,3 - dihydro - 1 - phenylsulfonyl-4(1H)-quinolone with a vinyl Grignard reagent to form the corresponding 4-vinylquinolin-4-ol; condensing said 4-vinylquinolin-4-ol with 2-methylcyclopentane-1,3-dione to form a 6-phenylsulfonyl-8,14-seco-6-azaestra-1,3,5(10),9(11)-tetraene-14,17-dione; and ring-closing said secoazaestratetraene under acidic conditions to form a 6-phenylsulfonyl-6 - azaestra - 1,3,5(10),8,14 - pentaen-17-one.

Figure 1:
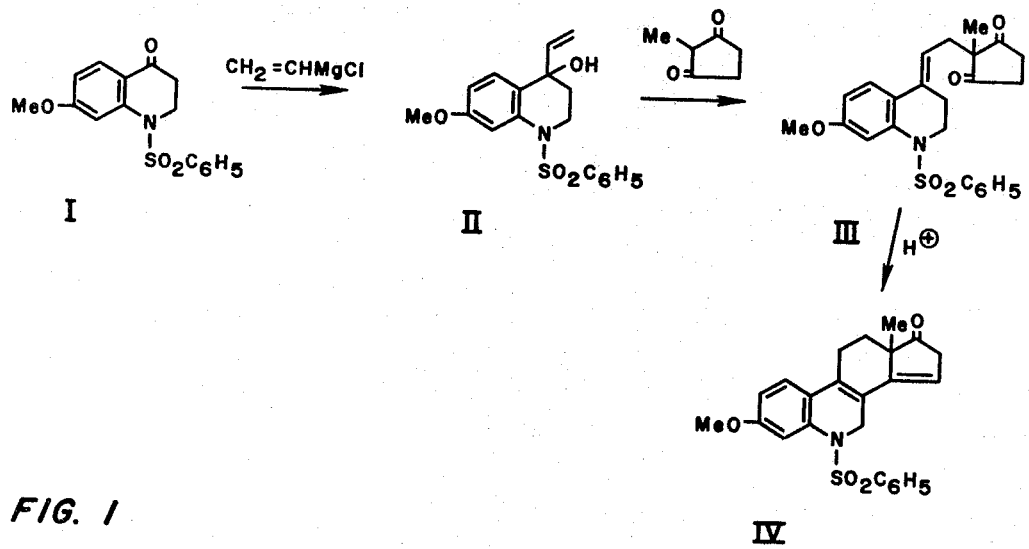
FIGURE 1 illustrates schematically the reaction sequence for preparing a 6-azaestra-1,3,5(10),8.14-pentaene, specifically 3 - methoxy - 6 - phenylsulfonyl - 6 - azaestra-1,3,5(10),8,14-pentaen-17-one.

The invention sought to be patented in a second composition aspect is described as residing in the concept of a 3-methoxy-6-phenyl-sulfonyl - 8,14 - seco - 6 - azaestra-1,3,5(10),9(11)-tetraene-14-17-dione (FIGURE 1, III).

The tangible embodiments of said second composition aspect possess the aplied use characteristic of being intermediates for the preparation of compositions exerting pharmacological effects as evidenced by standard test procedures.

The invention sought to be patented in a third composition aspect is described as residing in the concept of a 2,3-dihydro-7 - methoxy - 1 - phenylsulfonyl - 4 - vinyl-quinolin-4-ol (FIGURE 1, II).

The tangible embodiments of said third composition aspect possess the applied use characteristic of being intermediates for the preparation of compositions exerting pharmacological effects as evidenced by standard test procedures.

The invention sought to be patented in a second process aspect is described as residing in the reaction of a 2,3-dihydro-1-phenylsulfonyl-4-(1H)-quinolone with a vinyl Grignard reagent to form a 1,2,3,4-tetrahydro-1-phenyl-sulfonyl-4-vinylquinolin-4-ol.

The invention sought to be patented in a third process aspect is described as residing in the condensation of a 1,2,3,4-tetrahydro-1-phenylsulfonyl-4-vinylquinolin - 4 - ol with a 2-methylcyclopentane-1,3-dione to form a 6-phenylsulfonyl-8,14-seco - 6 - azaestra - 1,3,5(10),9(11)-tetraene-14,17-dione.

The invention sought to be patented in a fourth process aspect is described as residing in the ring-closure of a 6-phenylsulfonyl-8,14-seco - 6 - azaestra - 1,3,5(10),9(11)-tetraene-14,17-dione by means of acid to form a 6-phenyl-sulfonyl-6-azaestra-1,3,5(10),8,14-pentaen-17-one.

The invention sought to be patented in a fifth process aspect is described as residing in the oxidative aromatization of a 6-phenylsulfonyl-6-azaestra-1,3,5(10),8-tetraene by means of lithium in liquid ammonia.

The manner and process of making and using the invention will now be generally described so as to enable a person skilled in the art of chemistry to make and use the same, as follows:

Referring now to FIGURE 1, wherein the compounds are assigned Roman numerals for identification, the sequence of reactions involved in the synthesis of a specific embodiment, namely 3-methoxy - 6 - phenyl-sulfonyl-6-azaestra-1,3,5(10),8,14-pentaen-17-one, is illustrated, 2,3-dihydro - 7 - methoxy-1-phenylsulfonyl-4(1H)-quinolone (I) is added to a vinyl Grignard reagent such as vinyl magnesium chloride or bromide to form the vinyl alcohol 1,2,3,4-tetrahydro - 7 - methoxy-1-phenylsulfonyl-4-vinylquinolin-4-ol (II). This vinyl alcohol is condensed with 2-methylcyclopentane-1,3-dione using a basic catalyst such as potassium carbonate to form the secoazestratetraene 3 - methoxy - 6 - phenylsulfonyl-8,14-seco-6-azaestra-1,3,5(10),9(11)-tetraene-14,17-dione (III). Treatment of this seco compound with hydrochloric acid results in a ring-closure, yielding 3-methoxy - -6 - phenylsulfonyl-6-azaestra-1,3,5(10),8,14-pentaen-17-one (IV).

Compound IV, when administered to test rats in a five-hour oral diuretic assay, was found to be active as a diuretic and saluretic, and to possess a favorable sodium to potassium excretion ratio. Five hours after administration of compound IV at a dosage of 30 mg./kg. by stomach tube to male rats, blood samples showed a depression in blood sugar, indicative of hypoglycemic activity.

Figure 2:
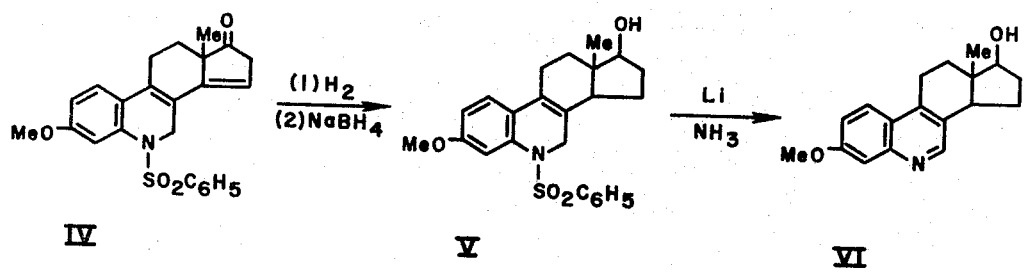
FIGURE 2 illustrates schematically the reaction sequence for preparing a 6-azaestra-1,3,5(10),6,8-pentaene, specifically 3-methoxy-6-azaestra-1,3,5(10),6,8 - pentaen-17-ol.

In addition, compound IV is an intermediate useful in the synthesis of additional 6-azaestrane compounds. For example, and with reference to FIGURE 2, hydrogenation in the presence of the selective catalyst such as 2% palladized strontium carbonate in benzene results in the formation of 3 - methoxy - 6 - phenylsulfonyl-6-azaestra-1,3,5(10), 8-tetraen-17-one. This tetraene is reduced to the corresponding 17β-hydroxy compound (V) by treatment with a reducing agent such as sodium borohydride. When either of the latter 6-azaestra-1,3,5(10),8-tetraenes is subjected to the action of lithium in liquid ammonia, in the presence or absence of ethanol, 3-methoxy-6-azaestra-1,3,5(10),6,8-tetraen-17-ol (VI) is produced. This compound is 17-dihydro-6-azaequinenin-methyl ether, which has been converted to 6-azaequilenin by Bruckhalter and Watanabe, Abstracts of the 143rd Meeting of the American Chemical Society, 1963, 14–A, by means of a bichromate oxidation of the 17-hydroxy group and cleavage of the 3-methoxy group by means of hydrobromic acid and acetic acid.

The above-mentioned aromatization, effected by lithium in liquid ammonia, is a part of the present invention and is indeed unexpected. Lithium and liquid ammonia is a reductive reagent combination which is generally utilized to reduce double bond systems. A chemist familiar with such reactions would have expected the 8(9) double bond of the 6-azaestra-1,3,5(10),8-tetraene to have been reduced. An oxidation by means of this reagent combination is thus unique and unexpected. The mechanism by which this unique reaction occurs is not yet fully understood.

It is thus apparent that compound IV, 3-methoxy-6-phenylsulfonyl - 6 - azaestra - 1,3,5(10),8,14-pentaen-17-one, in addition to its inherent usefulness as a diuretic and hypoglycemic, is useful as an intermediate for the synthesis of other 6-azaestranes, including the known compound 6-azaequilenin. In addition, reduction of the A and B-rings leads to the formation of 6-aza-19-nortestosterones.

The condensation of the vinylquinolinol II with 2-methylcyclopentane-1,3-dione can be affected using any of a variety of basic catalysts. These catalysts include alkali metal carbonates such as sodium and potassium carbonate, alkali metal hydoxides and alkoxides such as sodium and potassium hydroxide and ethoxide, and organic amines such as pyridine, triethylamine, and diethylamine. Ring closure of the seco compound III can be effected using acids such as hydrochloric, sulfuric, p-toluenesulfonic, or polyphosphoric acid.

As will be apparent by inspection of FIGURE 1, certain variants of the starting materials can be employed to perform a processes of this invention. It will be thus apparent that in place of the 7-methoxy group on the quinoline ring system, there can be other lower alkoxy groups such as ethoxy, propoxy, isopropoxy, or butoxy; alkenyloxy groups such as allyloxy; cycloalkoxy groups such as cyclopentyloxy or cyclohexyloxy; a hydroxy group; or a hydrogen atom. When such starting materials are employed in the processes of this invention, there will be formed 6-azaestranes bearing the corresponding lower alkoxy, alkenyloxy, cycloalkoxy, or hydroxy groups, or a hydrogen atom, in the 3-position thereof. Furthermore, by starting with a 5, 6, 7, or 8-polysubstituted quinoline, a 6-azaestrane which is correspondingly substituted in the 1, 2, 3 or 4-positions thereof is obtained. In the present invention, such compounds are the full equivalents of the 3-methoxy compounds, and processes utilizing such starting materials are the full equivalents of processes starting with the methoxy compounds.

We can utilize, in place of 2-methylcyclopentane-1,3-dione, any 2-alkylcyclopentane-1,3-dione in the condensation with the 4-vinylquinolin-4-ol. Among the alkyl groups which can thus appear on the cyclopentane ring are ethyl, propyl, isopropyl, butyl, pentyl, and cetyl. When used in the processes of this invention, such 2-alkyl-cyclopentanediones are converted into homologated 6-azaestranes having an alkyl group in the 13-position thereof. Such homologated 6-azaestranes are the full equivalents of the normal 6-azaestranes, and processes utilizing the alkyl starting materials and intermediates are the full equivalents of those processes utilizing the normal 6-azaestranes.

Cyclohexanediones can be used instead of cyclopentanediones in order to form D-homo-6-azaestranes. Such D-homo compounds and the processes for preparing them are the full equivalents of the corresponding compounds having the cyclopentane ring and of the processes for preparing them.

In place of the phenylsulfonyl group which appears on the nitrogen atom of the various quinoline and azaestrane compounds of the invention, there can be a tolylsulfonyl group, a methylsulfonyl group, or other aryl or lower alkylsulfonyl groups. Compounds which bear such substituted sulfonyl groups are the equivalents of the phenylsulfonyl compounds, and processes utilizing such substituted sulfonyl compounds are the equivalents of those utilizing the phenylsulfonyl compounds.

Compositions of the invention having a 17-ketone function can be converted to the corresponding 17-hydroxy compounds by reduction with an agent such as lithium aluminum hydride. These ketones can be treated with an organometallic reagent to introduce a group such as alkyl, alkenyl, or alkynyl into the 17α-position. They can be ketalized or thioketalized conventionally by treating with alcohols such as ethylene glycol, trimethylene glycol, ethanedithiol, or ethanol in the presence of an acid catalyst such as sulfuric acid or p-toluenesulfonic acid.

The 17-alcohols which result from the reduction of the 17-ketones may be esterified with any of a variety of acids by conventional means. Such acids include acetic, propionic, phenylpropionic, cyclopentanepropionic, valeric, and caproic acids. The hydroxy group may alternatively be etherified with reagents such as methyl iodide or dimethyl sulfate.

The quinoline starting materials utilized in the present invention are old or may be prepared according to methods known to the art. The specific compound 2,3-dihydro-7-methoxy-1-phenylsulfonyl-4(1H)-quinolone is described by Braunholtz et al., J. Chem. Soc. 1957, 4166. The synthetic method involves the condensation of a suitably substituted aniline with acrylic acid or an ester thereof, followed by cyclization.

The principal 6-azaestra-1,3,5(10),8,14-pentaene compositions can be prepared by an alternative route. A suitably substituted aniline such as m-methoxyaniline is treated with 1-buten-3-yne to produce a 4-anilino-1-butyne. Mannich condensation with formaldehyde and diethylamine yields a 1-diethylamino-5-anilino-2-pentyne. Hydration by means of aqueous mercuric sulfate and sulfuric acid results in the formation of 1-diethylamino-5-m-methoxyanilinopentan-3-one. The formation of this ketamine is accomplished by the production of an elimination product, 5-m-methoxyanilino-1-penten-3-one. Either of these compounds, or a mixture of them, is subjected to a Michael condensation with 2-methylcyclopentane-1,3-dione in the presence of a base such as methanolic potassium hydroxide to form the trione 2-(5-m-methoxyanilino-3-oxopentyl)-2-methylcyclopentane-1,3-dione. This latter compound is then cyclodehydrated by dissolving in a solvent such as benzene containing a catalytic amount of p-toluenesulfonic acid and refluxing under a Dean-Stark trap until two equivalents of water are collected. Alternatively, the trione is treated with polyphosphoric acid at room temperature or slightly above until ring-closure is complete. The product is 3-methoxy-6-azaestra-1,3,5(10),8,14-pentaen-17-one, which can be converted to the appropriate sulfonamide by treatment with a reagent such as benzene-sulfonyl chloride, p-toluenesulfonyl chloride, or methanesulfonyl chloride.

The compositions of this invention may be formulated for pharmaceutical use as solid capsules, tablets, suppositories, etc. by combining them with conventional carriers. Such conventional solid carriers includes magnesium carbonate, magnesium stearate, talc, sugar, lactose, dextrin, pectin, starch, gelatin, tragacanth, methylcellulose and sodium carboxymethylcellulose. Diluents, flavoring agents, solubilizers, lubricants, suspending agents, binders, or tablet-disintegrating agents may be employed. Liquid preparations such as solutions, suspensions, or emulsions may also be prepared. A water-propylene glycol solution may be used for parenteral injection. An aqueous suspension suitable for oral use can be made by utilizing natural or synthetic gums, resins, methylcellulose, or other well-known suspending agents.

The following examples set forth the best mode contemplated by the inventors of carrying out their invention.

*Example 1.—1,2,3,4-tetrahydro-7-methoxy-1-phenylsulfonyl-4-vinylquinolin-4-ol*

Add 2,3 - dihydro - 7 - methoxy - 1 - phenylsulfonyl-4(1H)-quinolone (Braunholtz et al., J. Chem. Soc., 1957, 4166) (56 g.) in tetrahydrofuran (250 ml.) with stirring under nitrogen to vinyl magnesium chloride (49.6 g.) in tetrahydrofuran (1 liter) at 0°. After stirring for three hours, pour into ice-cold ammonium chloride solution and extract with ether. Recrystallize the isolated product from ether-hexane to obtain the title compound (44 g.), M.P. 90–94°.

*Example 2.—3-methoxy-6-phenylsulfonyl-8,14-seco-6-azaestra-1,3,5(10),9(11)-tetraene-14,17-dione*

Reflux 2-methylcyclopentane-1,3-dione (26 g.) with 1,2,3,4 - tetrahydro - 7 - methoxy - 1 - phenylsulfonyl - 4-vinylquinolin-4-ol (52 g.) and a pinch of potassium carbonate in methanol (80 ml., for twenty-four hours. Cool, add to aqueous sodium bicarbonate, and extract with ether. Wash the ether extracts with aqueous sodium bicarbonate and water, and dry. Recrystallize the isolated product from methanol containing a little tetrahydrofuran to obtain the title compound (45.5 g.), M.P. 112–116°.

*Example 3.—3-methoxy-6-phenylsulfonyl-6-azaestra-1,3,5(10),8,14-pentaen-17-one*

Heat to boiling 3-methoxy-6-phenylsulfonyl-8,14-seco-6-azaestra-1,3,5(10),9(11)-tetraene-14,17-dione (6 g.) in methanol (36 ml.) and tetrahydrofuran (24 ml.) Add 11 N hydrochloric acid (14 ml.) slowly with swirling. Cool and filter off the resulting precipitate. Recrystallize from tetrahydrofuran-methanol to obtain the title product (5 g.), M.P. 169–173°.

*Analysis.*—Calcd. for $C_{24}H_{23}NO_4S$: C, 68.39%; H, 5.50%; N, 4.27%; S, 7.61%. Found: C, 68.59%; H, 5.51%; N, 3.32%; S, 7.70%.

*Example 4.—3-methoxy-6-phenylsulfonyl-6-azaestra-1,3,5(10),8-tetraen-17-one*

Shake 3 - methoxy - 6 - phenylsulfonyl - 6 - azaestra-1,3,5(10),8,14-pentaen-17-one (21.5 g.) with hydrogen at atmospheric pressure in benzene (530 ml.) with 2% palladized strontium carbonate (12 g.) until 1,200 cc. of hydrogen are absorbed (about one hour). Recrystallize from methanol to obtain the title produce (10.35 g.), M.P. 173–177°.

*Analysis.*—Calcd. for $C_{24}H_{25}NO_4S$:C, 68.06%; H, 5.85%; N, 3.31%; S, 7.57%; Found: C, 67.97%; H, 5.95%; N, 3.49%; S, 7.8%.

*Example 5.—3-methoxy-6-phenylsulfonyl-6-azaestra-1,3,5(10),8-tetraen-17-ol*

Suspend 3 - methoxy - 6 - phenylsulfonyl - 6 - azaestra-1,3,5(10),8-tetraen-17-one (5 g.) in methanol (100 ml.) and tetrahydrofuran (20 ml.) and treat with sodium borohydride (2 g.). When reaction has ceased, add acetic acid (10 ml.) and evaporate. Shade the residue with ether and water until complete solution is achieved, and wash the organic layer with saturated sodium bicarbonate solution and water. Dry and evaporate. Crystallize from methanol-water (10:1) to obtain the title product (4 g.), M.P. 154–157°.

*Example 6.—3-methoxy-6-azaestra-1,3,5(10),6,8-pentaen-17-ol*

Add 3 - methoxy - 6 - phenylsulfonyl - 6 - azaestra-1,3,5(10)8-tetraen-17-ol (1 g.) in tetrahydrofuran (50 ml.) to distilled liquid ammonia (100 ml.). Then add lithium metal (0.03 mg., 2 atomic equivalents) and stir vigorously until all the lithium has dissolved. Add dilute acetic acid (50% w./v.) and then an excess of water. Extract with ether and then extract with the ether layers with 10% hydrochloric acid. Make basic the aqueous acid extracts and extract again with ether. Wash the ether extracts with water, saturated sodium bicarbonate solution, and water, dry, and evaporate to obtain the title product (200 mg.). Ultraviolet absorption: $\lambda_{max}$. 234, 326, 340 m$\mu$ ($\epsilon$ 54,200, 4,700, 4,700). Infrared absorption peak at 3,165 cm.$^{-1}$.

We claim:

1. 3 - methoxy - 6 - phenylsulfonyl - 6 - azaestra-1,3,5(10),8,14-pentaen-17-one.

2. 3 - methoxy - 6 - phenylsulfonyl - 8,14 - seco- 6 - azaestra-1,3,5(10),9(11)-tetraene-14,17-dione.

3. 1,2,3,4 - tetrahydro - 7 - methoxy - 1 - phenylsulfonyl-4-vinylquinolin-4-ol.

4. A process for the preparation of a 6-azaestra-1,3,5(10),6,8-pentaene comprising for oxidative aromatization of a 6-phenylsulfonyl-6-azaestra-1,3,5(10),8-tetraene by means of lithium in liquid ammonia.

References Cited

UNITED STATES PATENTS

| | | | |
|---|---|---|---|
| 2,796,420 | 6/1957 | Weisenborn | 260—287 |
| 2,921,964 | 1/1960 | Ramsden | 260—289 X |
| 3,219,668 | 11/1965 | Brown et al. | 260—289 |

OTHER REFERENCES

Huisman et al.: Rec. Trav. Chim., volume 82, page 898 to 900 (1963).

ALEX MAZEL, *Primary Examiner.*

D. G. DAUS, *Assistant Examiner.*